United States Patent [19]
Bigg

[11] Patent Number: 5,451,439
[45] Date of Patent: Sep. 19, 1995

[54] THERMOPLASTIC ELASTOMER SUBSTITUTE FOR NATURAL RUBBER

[75] Inventor: Donald M. Bigg, Columbus, Ohio

[73] Assignee: Electric Power Research Institute, Inc., Palo Alto, Calif.

[21] Appl. No.: 181,703

[22] Filed: Jan. 14, 1994

[51] Int. Cl.$^6$ ................... A41D 19/00; B29D 22/00
[52] U.S. Cl. ...................... 428/36.8; 2/161.7; 2/167; 2/168; 525/98
[58] Field of Search ............ 525/98; 2/168, 167, 2/161.7; 428/36.8

[56] References Cited

U.S. PATENT DOCUMENTS

| | | | |
|---|---|---|---|
| 3,299,174 | 1/1967 | Kuhre | 525/98 |
| 3,459,831 | 8/1969 | Luftglass | 525/98 |
| 4,904,731 | 2/1990 | Holden | 525/98 |
| 4,921,672 | 5/1990 | Bock | 264/161 |

OTHER PUBLICATIONS

KCL Company Brochure, date unknown.
*Novel Rheological Behavior Claimed for New-Tech Polyolefins*, Plastics Technology, Nov. 1992, pp. 23–25.
*Vector ® The Direction in Styrenic Block Copolymers*, Dexco Polymers product information brochure, Jan. 1992.
Lebel, Mark A., *Thermoplastic Elastomers*, Plastics Engineering, Jan. 1994, pp. 23–26.
Rifi, M. R. et al., *Flexomer TM Polyolefins: A Bridge Between Polyetheylene and Rubbers*, Union Carbide Chemicals and Plastics Inc. brochure, 1990.
Rundlof, L. C., *Flexomer TM Polyolefins*, date unknown.
*New polyolefin resins emerge: 'Branched linear' copolymers*, Modern Plastics, Nov. 1992, pp. 20–25.
Leaversuch, Robert D., *Add very low density PE to the list of options in polyolefin resins*, Modern Plastics, Jul. 1992, pp. 48–50.
Charmas, Dan, *Dow offers resins made with metallocence catalyst method*, Plastics News, Sep. 13, 1993, p. 47.
Schwank, Don, *Single-site metallocence catalysts yield tailor–made polyolefin resins*, Modern Plastics, Aug. 1993, pp. 49–50.
Leaversuch, Robert D., *Polyolefins gain higher performance from new catalyst technologies*, Modern Plastics, Oct. 1991, pp. 46–49.
*Dow awarded metallocene patent*, Plastics Technology, Nov. 1992.
*Dow plans three-phase rollout of polyolefin 'plastomers' and elastomers*, Plastics Technology, Nov. 1992, p. 63.
*Phillips 66 will soon offer its first LLDPE*, Plastics Technology, Nov. 1992, p. 63.
*New polyolefins excel as impact modifiers*, Plastics Technology, Nov. 1992, p. 11.

Primary Examiner—James J. Seidleck
Assistant Examiner—I. Zemel
Attorney, Agent, or Firm—Flehr, Hohbach, Test, Albritton & Herbert

[57] ABSTRACT

Mixtures of styrene-isoprene block copolymer and ultralow density polyethylene are provided as moldable rubber substitutes. These mixtures may be used in the production of electrical lineman's gloves and other flexible items such as other types of gloves, tubing, balloons, condoms, toys, inflatable liners, baby nipples, and rubber bands.

6 Claims, No Drawings

THERMOPLASTIC ELASTOMER SUBSTITUTE FOR NATURAL RUBBER

FIELD OF THE INVENTION

The present invention relates to blends of styrene-isoprene block copolymers and ultralow density polyethylene to be used in the production of rubber substitutes. These blended compositions may be used in the production of electrical linemen's gloves and other flexible items such as other types of gloves, tubing, balloons, condoms, toys, inflatable liners, baby nipples, and rubber bands.

BACKGROUND OF THE INVENTION

Natural rubber compounds are used in a wide variety of products, including electrical linemen's gloves. The American Standards of Testing Materials (ASTM) has strict requirements for the characteristics of electrical linemen's gloves, which include toughness, hardness, elongation to break, puncture resistance and strength, as outlined in ASTM-D120. In addition, the gloves must be flexible enough to allow the workmen to handle small objects and perform intricate manipulations.

The gloves are currently made by a process whereby the natural rubber is dissolved in naphtha, a volatile solvent, to produce a viscous solution. A porcelain mold is then dipped into the rubber solution. This coats the mold with the rubber solution. When the coated mold is removed from the solution, the solvent is allowed to evaporate. This dipping procedure is then repeated as many as 50 or 60 times to produce the required thickness of rubber needed for a glove. The exact number of dips, and thus the thickness of the glove, is dependent upon the type of glove being produced. The complete dipping process can take up to two weeks to produce a glove. Evaporation of the solvent cannot be too fast or a large number of voids, or inconsistencies within the surface, will be generated. Once the required thickness has been reached, the rubber is vulcanized, or cured, in a steam oven. The glove is then tested for physical defects and electrical properties. The reject rate due to the inconsistencies can be as high as 30 percent, which is a significant portion of the manufacturing cost.

The use of the solvent is a particular problem in this process. While solvent emissions can be minimized, there is a significant expense associated with solvent recovery. The use of solvents is also largely responsible for the high reject rate, since solvent evolution is responsible for the pinholes and voids in the gloves that lead to premature electrical breakdown or tearing of the gloves.

Clearly there is a need to produce gloves in a faster, higher yielding productive process, without the use of solvents.

Recent developments in Germany by Cachele-Cama Latex (KCL) showed that a butyl rubber compound could be injection molded to produce electrical linemen's gloves. This process is relatively slow, in that the rubber must be cured in the mold. The butyl rubber glove is also stiffer than desired by many workers.

Developments in elastomer chemistry have enabled the replacement of many traditional applications of rubber with new thermoplastic elastomers. In the early attempts, these elastomers produced stiff and hard materials. Later developments have led to softer thermoplastic elastomers that have begun to compete with natural rubber, particularly unfilled rubber. These thermoplastic elastomers include various styrene, isoprene and styrene-butadiene block copolymers, polyurethanes, nylon copolymers, acrylic copolymers, and more recently ultralow density polyethylene. (For a review of these compounds, see for example, Plastic News, Sep. 13, 1993, page 47; Modern Plastics, August 1993, page 49; Plastics Technology, November 1992, page 63; Plastics Technology, November 1992, page 26; Modern Plastics, July 1992, page 48; Modern Plastics, November 1992, page 20; Modern Plastics, November 1992, page 82. Also see the product literature of Estamid 90A, made by the Upjohn Company; Santoprene TPE-06-08, made by Advanced Elastomer Systems; 2363 Series Pellethane Polyurethane Elastomers, made by Dow, Inc.; and the Vector products made by Dexco Polymers).

Thermoplastic elastomers have a number of advantages. They neither require solvents nor curing. They can be injection molded, thus producing a pair of useable gloves in less than 2 minutes. Because they do not use solvents and are molded under pressure, the molded gloves are less likely to contain voids or pinholes, thus drastically reducing the reject rate.

At present, the material that more closely matches the properties required by ASTM-D120 for an electrical linemen's glove are the styrene-isoprene block copolymers. Table 1 shows that several grades of this type of copolymer meet all of the mechanical properties required by the standard. No other thermoplastic elastomer was found to meet these requirements, since generally the Shore A hardness was too great. The electrical properties of the styrene-isoprene materials are also considered quite good, since styrene is an excellent insulator and isoprene is the synthetic analog of natural rubber.

TABLE 1

Properties of Selected Styrene-Isoprene Block Copolymers

| Property | ASTM Goals | Grade | Grade | Grade |
|---|---|---|---|---|
| Grade | | Kraton 1107 | "VECTOR 4113" | "VECTOR 4100D" |
| Supplier | — | Shell | Dexco | Dexco |
| Hardness, Shore A | 47 max | 36 | 35 | 38 |
| Tensile Strength, MPa | 10.3 min | 18.6 | 18.8 | 23.2 |
| 200% Stress, MPa | 2.1 max | 1.0 | 0.4 | 0.6 |
| Elongation-at-Break, % | 500 min | 1350 | 1500 | 1400 |
| Tensile set, % | 25 max | 8 | — | — |
| Tear Resistance, ku/M | 14 min | 31 | 22 | 27 |
| Puncture Resistance, kN/M | 18 min | — | 77 | 106 |

These low-hardness styrene-isoprene copolymers meet the mechanical and flexibility requirements for gloves; however, these copolymers are quite tacky, resulting in their primary use as adhesives. This high surface tack renders them undesirable for use in gloves.

Another relatively new polymer development is the development of ultralow density polyethylenes. These compounds, which are highly elastomeric, have been only recently commercialized, and have a number of potential uses such as in medical tubing and cable insulation. Ultralow density polyethylenes cannot be used directly for gloves since they have an excessive degree of tensile set, and have a Shore hardness that is also too high. Table Two describes some of these ultralow density polyethylenes and their characteristics.

TABLE 2

Description of Candidate Ultralow-Density Polyethylenes

| | Grade | | | |
|---|---|---|---|---|
| | MQF0 | 4041 | B-14 | C-39 |
| Supplier | Enichem | Exxon | Dow | Dow |
| Tensile Strength, MPa | 6.8 | 28.7 | 7.0 | 2.0 |
| Elongation-at-Break, % | 900 | 800 | 1200 | 1800 |
| 200% Modulus, MPa | 3.7 | 3.4 | 2.2 | 1.0 |
| Hardness, Shore A | 80 | 76 | 65 | 50 |

Accordingly, it would be desirable to have a thermoplastic elastomer mixture which meets the ASTM-D120 requirements for electrical linemen's gloves but has a surface tack comparable to rubber gloves. Once developed, such a mixture could be used to replace a variety of other natural rubber uses.

SUMMARY OF THE INVENTION

It is a general object of the present invention to provide compositions which may be used as rubber substitutes for a variety of applications. These compositions may be readily molded in the absence of solvents into a variety of forms.

It is a particular object to provide new compositions which may be used to form electrical lineman's gloves, and for methods of making electrical lineman's gloves.

In particular, the present invention provides compositions comprising mixtures of a styrene-isoprene block copolymer and an ultralow density polyethylene. These mixtures have a ratio of styrene-isoprene block copolymer:ultralow density polyethylene ranging from about 90:10 to about 60:40. These compositions have a surface tack similar to natural rubber.

In one aspect of the invention, the compositions are in a form such as gloves, tubing, condoms, balloons, toys, inflatable liners, baby nipples and pacifiers.

A preferred aspect of the invention provides compositions for use in electrical lineman's gloves. These compositions are mixtures of styrene-isoprene block copolymers and have characteristics which meet the standards of material used as electrical lineman's gloves.

In this aspect, the compositions of the present invention comprise mixtures of styrene-isoprene block copolymer and ultralow density polyethylene. These mixtures have a ratio of styrene-isoprene block copolymer:ultralow density polyethylene ranging from about 90:10 to about 60:40. Additional embodiments have ratios ranging from about 85:15 to about 70:30, and 80:20.

In another aspect, the present invention provides electrical lineman's gloves made of compositions of mixtures of styrene-isoprene block copolymers and ultralow density polyethylene. These mixtures have ratios of styrene-isoprene block copolymer:ultralow density polyethylene ranging from about 90:10 to about 60:40.

Methods of making electrical lineman's gloves are also provided. This method comprises injection molding compositions of mixtures of styrene-isoprene block copolymers to form electrical lineman's gloves.

DETAILED DESCRIPTION OF THE INVENTION

The present invention relates to compositions of thermoplastic elastomers and ultralow density polyethylene to form rubber substitutes, including electrical lineman's gloves. In one embodiment, these thermoplastic elastomers are styrene-isoprene block copolymers.

In one embodiment, the present invention provides compositions for use as rubber substitutes in general. These compositions are mixtures of styrene-isoprene block copolymers and ultralow density polyethylene, ranging from about 90% styrene-isoprene block copolymer and 10% ultralow density polyethylene to about 60% styrene-isoprene block copolymer and 40% ultralow density polyethylene. Preferred embodiments utilize ratios ranging from about 85:15 to about 70:30. The most preferred embodiment uses a ratio of about 80:20. Unless otherwise noted, all ratios are expressed as percentages by weight.

These compositions have a surface tack similar to natural rubber. In this sense, "surface tack" refers to a tactile quality of the composition to feel somewhat sticky or gummy. Surface tack is generally evaluated by touching the surface of the composition. Natural rubber and rubber substitutes all have some level of surface tack, and thus some level of surface tack is acceptable. It is to be understood that the level of surface tack tolerated will depend on the product made of the composition. For example, electrical lineman's gloves generally may not be stickier than natural rubber. In other embodiments, higher levels of surface tack may be tolerated or desired. In additional embodiments, undesirable levels of surface tack may be treated later, by using various surface treatments on the objects made of the compositions of the present invention.

In one embodiment, the compositions of the present invention are used to form objects normally made of natural rubber or rubber substitutes, using techniques well known in the art such as injection molding. As used herein, "molding" includes injection molding, compression molding, blow molding and extrusion. One skilled in the art will realize the versatility of the compositions of the present invention, and the ability of these compositions to replace rubber in a wide variety of uses and processes.

For example, the compositions of the present invention may be used to form other types of gloves, such as surgical or kitchen gloves. The compositions may be used to make tubing of all sorts, for example medical tubing such as catheters. Other objects which may be made of the compositions of the present invention include condoms, balloons, baby nipples and pacifiers, toys, inflatable liners, and rubber bands, using techniques well known in the art.

In a preferred embodiment, the compositions of the present inventions have characteristics which meet the standards of material used as electrical lineman's gloves. Some of these standards are outlined in ASTM-D120. These standards include the following:

| Characteristic | ASTM-D120 requirement |
|---|---|
| Shore A Hardness | 47 maximum |
| Tensile strength, in MPa | 10.3 minimum |

-continued

| Characteristic | ASTM-D120 requirement |
|---|---|
| 200% Stress, in MPa | 2.1 maximum |
| Elongation-at-break, % | 500 minimum |
| Tensile Set, % | 25 maximum |
| Tear resistance, kN/M | 14 minimum |
| Puncture resistance, kN/M | 18 minimum |
| AC Breakdown Strength, kV/mm | 19699 minimum |

In addition, for purposes of the present invention, such standards of material include the absence of excessive surface tack, i.e. the surface tack must be no greater than the surface tack of natural rubber.

Thus in a preferred embodiment, the compositions of the present invention will have a Shore A Hardness of less than 47, with a preferred range of about 35 to about 47. The composition will have a tensile strength of at least 10.3 MPa, with a preferred range of about 10.3 to about 30 MPa. The composition will have a 200% stress of less than 2.1 MPa, with the preferred range of about 0.5 to about 2.1, and an elongation-at-break of at least 500%, the preferred range being about 500 to about 1500 %. The composition should have a tensile set of less than 25%, with a preferred range of about 1 to about 25%. The composition will have a tear resistance of at least 14 kN/M, with a preferred range of about 14 to about 40 kN/M, and a puncture resistance of at least 18 kN/M, with a preferred range of about 18 to about 40 kN/M. Finally, the composition should have an AC breakdown strength of at least 19699 kV/mm, with a preferred range of about 25000 to about 45000 kV/mm. The composition will additionally have an acceptable level of surface tack, approximating the surface tack of natural rubber, or less. Compositions which meet or exceed these standards may be used in the formation of electrical lineman's gloves.

In a preferred embodiment, electrical lineman's gloves made of the compositions of the present invention have characteristics or qualities that exceed the ASTM-D120 standards. For example, the compositions of the present invention allow the formation of gloves that exhibit greater tear strength, tensile strength and puncture resistance than those made of natural rubber, as shown in Table 11, for example.

In alternative embodiments, one or more of these characteristics may not be met, depending on the use of the composition. For example, the AC breakdown strength may not be an important characteristic for some applications and uses of these compositions, such as balloons or baby nipples or pacifiers. Other characteristics will vary in a similar manner.

In one embodiment, the composition is made using styrene-isoprene block copolymers. By the term "styrene-isoprene block copolymer" or grammatical equivalents herein is meant a block copolymer of styrene and isoprene. Generally, the percentage of styrene in the block may range from about 10% to about 25%, with preferred embodiments ranging from about 12% to about 20%, and the most preferred embodiment having 15 percent of styrene. The percentage of isoprene in the block may range from about 75% to about 90% with preferred embodiments ranging from about 80% to about 88%, and the most preferred embodiment having 85 percent of isoprene.

Examples of suitable styrene-isoprene block copolymers are sold by Shell, Inc., under the tradename "KRATON 1107", and by Dexco, Inc., under the tradename "VECTOR 4133".

Included within the definition of "styrene-isoprene block copolymer" are copolymers with two block segments and three block segments (e.g. styrene-isoprene-styrene block copolymer). Alternatively, four or more block segments is encompassed by the term. In a three block embodiment such as styrene-isoprene-styrene block copolymer, the percentage of styrene in the block may range from about 10% to about 25%, with preferred embodiments ranging from about 12% to about 20%, and the most preferred embodiment having 15 percent of styrene. The percentage of isoprene in the block may range from about 75% to about 90%, with preferred embodiments ranging from about 80% to about 88%, and the most preferred embodiment having 85% percent of isoprene.

An example of a suitable styrene-isoprene-styrene block copolymer is sold by Dexco, Inc., under the tradename "VECTOR 4100D".

The compositions of the present invention also include ultralow density polyethylenes. Ultralow density polyethylenes are a relatively new form of thermoplastic elastomer and are highly elastomeric. Generally, an ultralow density polyethylene is defined as having a density less than about 0.92 g/cc. In one embodiment, the ultralow density polyethylene of the present invention has a density ranging from about 0.86 to about 0.92 g/cc, with preferred embodiments having a density ranging from about 0.88 to about 0.91 g/cc, and the most preferred embodiment having a density of 0.90 g/cc.

In addition, ultralow density polyethylenes have other characteristics as outlined in Table 2. Accordingly, an ultralow density polyethylene of use in the present invention will have a Shore A hardness ranging from about 30 to about 80, and a most preferred hardness of 47. The tensile strength of the ultralow density polyethylene will range from about 2 to about 30 MPa, with preferred embodiments having tensile strengths ranging from about 6 to about 30 MPa, and the most preferred embodiment having a tensile strength of about 30 MPa. The elongation-at-break of the ultralow density polyethylene will range from about 500 to about 2000%, with preferred embodiments having a range of about 800 to about 1800%, and the most preferred embodiment having an elongation-at-break of 1200%. The 200% stress of the ultralow density polyethylene will range from about 0.5 to about 4.0 MPa, with preferred embodiments ranging from about 0.5 to about 2 MPa and the most preferred embodiment having a 200% stress at about 2 MPa.

Examples of suitable ultralow density polyethylenes are sold by Enichem, Inc. under the tradename "MQF0", by Exxon, Inc. under the tradename "EXACT", and by Dow, Inc. under the tradename "AFFINITY".

The styrene-isoprene block copolymer and the ultralow density polyethylene are mixed together in various amounts to form the compositions of the present invention. Generally the mixture will be a ratio of styrene-isoprene block copolymer:ultralow density polyethylene ranging from about 90:10 to about 60:40. The minimum amount of ultralow density polyethylene in the composition is set by the amount needed to reduce the surface tack of the composition. This is generally around 10 to 15%, but those skilled in the art will realize that the requirement may vary with different polyethylenes.

The maximum amount of ultralow density polyethylene in the composition is determined by the point at which a phase shift occurs. That is, at percentages greater than about 40% polyethylene, a phase shift occurs which changes the matrix structure from a styrene-isoprene form to a polyethylene form. Those skilled in the art will recognize that this phase shift may occur at slightly different points for different block copolymers.

In one embodiment the ratio of styrene-isoprene block copolymer:ultralow density polyethylene can vary from about 90:10 to about 60:40. Preferred embodiments will have ratios from about 85:15 to about 70:30, with a specific preferred embodiment having a ratio of about 80:20. It is to be understood that the compositions of the present invention can be formulated in a variety of ratios including but not limited to 90:10, 89:11, 88:12, 87:13, 86:14, 85:15, 84:16, 83:17, 82:18, 81:19, 80:20, 79:21, 78:22, 77:23, 76:22, 75:25, 74:26, 73:27, 72:28, 71:29, 70:30, 69:31, 68:32, 67:33, 66:34, 65:35, 64:36, 63:37, 62:38, 61:39, and 60:40. In addition, one skilled in the art will realize that a single block copolymer species and a single polyethylene species can be formulated at a variety of ratios to form the compositions of the present invention.

In a preferred embodiment, the styrene-isoprene copolymer and the ultralow density polyethylene are melt mixed at temperatures between 125° C. and 300° C., depending on the characteristics of the compounds being used. For styrene-isoprene block copolymers and ultralow density polyethylene, melting temperature ranges of between 170° C. and 210° C. are preferred.

In a preferred embodiment, the copolymer and polyethylene are melt mixed in two-roll mills, and in twin-screw extruders. Alternative embodiments employ single roll mills and internal batch mixers.

In the preferred embodiment, the electrical lineman's gloves are formulated solely of the compositions of the present invention. In alternative embodiments, the gloves may contain a lining or a coating made of other materials.

It is to be understood that the compositions of the present invention may replace natural rubber, including unreinforced and unfilled rubber, in any number of applications. As above, the compositions of the present invention may be used in conjunction with other materials, depending on the object to be made.

The following examples serve to more fully describe the manner of using the above-described invention, as well as to set forth the best modes contemplated for carrying out various aspects of the invention. It is understood that these examples in no way serve to limit the true scope of this invention, but rather are presented for illustrative purposes.

EXAMPLES

Example 1

Blends of "KRATON 1107" Type Styrene-Isoprene block copolymer and MQF0 Polyethylene "KRATON 1107" styrene-isoprene block copolymer was obtained from Shell, Inc., and "MQF0" polyethylene was obtained from Enichem, Inc. The blends shown in Tables Three and Four were produced by melt mixing at temperatures between 170° C. and 210° C. in lab-scale two-roll mills, and in twin-screw extruders. Injection molding was done on a 75 ton, 6 oz. molding machine.

Percent weight ratios of "KRATON 1107" styrene-isoprene block copolymer: "MQF0" ultralow density polyethylene were made at 100:0, 90:10, 80:20, 70:30, 60:40, 60:40, 40:60, 30:70, 20:80, 10:90, and 0:100.

Shore A hardness was tested using the procedures outlined in ASTM D2240.

Tensile strength was tested using the procedures outlined in ASTM D412.

200% stress was tested using the procedures outlined in ASTM D412.

Elongation-at-break was tested using the procedures outlined in ASTM D412.

Tensile set was tested by using the procedures outlined in ASTM D412.

Tear resistance was tested by using the procedures outlined in ASTM D624.

Puncture resistance was tested using the procedures outlined in ASTM D120.

AC breakdown was tested using the procedures outlined in ASTM D149.

Surface tack was not measured quantitatively, but was determined by touch.

The results of such tests are shown in Table 3.

TABLE 3

Mechanical Properties of (Styrene-Isoprene/Ultralow-Density Polyethylene Blends- "KRATON 1107" Type Block Copolymer - "MQF0" Polyethylene-

| Property | Goal, Type II Glove | Styrene-Isoprene/Ultralow-Density Polyethylene Ratios | | | | | | | | | | |
|---|---|---|---|---|---|---|---|---|---|---|---|---|
| | | 100/0 | 90/10 | 80/20 | 70/30 | 60/40 | 50/50 | 40/60 | 30/70 | 20/80 | 10/90 | 0/90 |
| Hardness, Shore A | 47 max | 36 | 40 | 45 | 53 | 64 | 67 | 71 | 79 | 82 | 84 | 86 |
| Tensile Strength, MPa | 10.3 min | 18.6 | 16.8 | 13.5 | 9.3 | 3.2 | 3.3 | 3.6 | 4.1 | 4.5 | 4.6 | 6.6 |
| 200% Stress, MPa | 2.1 max | 1.0 | 0.8 | 1.2 | 1.3 | 1.9 | 2.0 | 2.2 | 2.9 | 3.0 | 3.4 | 3.7 |
| Tensile Set, % | 25 max | 8 | 7 | 12 | 54 | 148 | — | — | — | — | — | — |
| Ultimate Elongation, % | 500 min | 1350 | 1450 | 1350 | 1375 | 1150 | 900 | 900 | 800 | 850 | 750 | 900 |
| Tear Resistance, kN/m | 14 min | 31 | 27 | 25 | 26 | 25 | 30 | 30 | 32 | 36 | 35 | 44 |
| Surface Tack | | +++ | + | — | — | — | — | — | — | — | — | — |

The results show that all blends in this series with polyethylene contents below 30 percent met all of the ASTMD-D120 requirements, except that the blend lacking polyethylene had an unacceptable level of surface tack.

At a polyethylene content above 40 percent, a phase shift from the styrene-isoprene matrix to the polyethylene matrix occurred. This results in Shore A hardness values being too high, and poor tensile set, characteristics resulting from the polyethylene matrix.

Example 2

Blends of "KRATON 1107" Type Styrene-Isoprene block copolymer and "MQF0" Polyethylene The range between 80:20 and 70:30 percent ratios of "KRATON 1107" styrene-isoprene block copolymer: "MQF0" ultralow density polyethylene was further explored as outlined in Table 4. Ratios of 80:20, 78:22, 76:24, 72:28, and 70:30 were run, and tested according to the methods of Example 1.

TABLE 4

Mechanical Properties of (Styrene-Isoprene/Ultralow-Density Polyethylene) Blends KRATON 1107 Type Block Copolymer/MQF0 Polyethylene-

| Property | Goal, Type II Glove | Styrene-Isoprene-Styrene/Ultralow-Density Polyethylene Ratios | | | | | |
|---|---|---|---|---|---|---|---|
| | | 70/30 | 72/28 | 74/26 | 76/24 | 78/22 | 80/20 |
| Hardness, Shore A | 47 max | 53 | 53 | 53 | 47 | 46 | 45 |
| Tensile Strength, MPa | 10.3 min | 9.3 | 9.6 | 12.6 | 13.2 | 10.5 | 13.5 |
| 200% Stress, MPa | 2.1 max | 1.3 | 1.5 | 1.6 | 1.3 | 1.4 | 1.2 |
| Tensile Set, % | 25 max | — | — | — | — | — | — |
| Ultimate Elongation, % | 500 min | 1375 | 1395 | 1834 | 1920 | 1527 | 1350 |
| Tear Resistance, kN/m | 14 min | 26 | 23 | 26 | 23 | 26 | 25 |
| Surface Tack | | — | — | — | — | — | — |

The results show that blends with polyethylene contents of 24 percent or less met all of the requirements for a glove.

Example 3

Blends of Dexco "VECTOR 4113" Styrene-Isoprene block copolymer and "MQF0" polyethylene "VECTOR 4113" styrene-isoprene block copolymer was obtained from Dexco Inc., and "MQF0" polyethylene from Enichem, Inc. The blends shown in Table Five were produced by melt mixing as outlined in Example One, at temperatures between 170° C. and 210° C. in lab-scale two-roll mills, and in twin-screw extruders. Injection molding was done on a 75 ton, 6 oz. molding machine.

Percent weight ratios of Dexco "4113" styrene-isoprene block copolymer: "MQF0" ultralow density polyethylene were made at 100:0, 90:10, and 80:20, tested according to the methods of Example 1, and the results shown in Table 5.

TABLE 5

Mechanical Properties of (Styrene-Isoprene Copolymer/Ultralow-Density Polyethylene) Blends-Dexco 4113 Type Copolymer-MQF0 Polyethylene-

| Property | Goal, Type II Glove | 4113/ MQF0 100/0 | 4113/ MQF0 90/10 | 4113/ MQF0 80/20 |
|---|---|---|---|---|
| Hardness, Shore A | 47 max | 35 | 39 | 45 |
| Tensile Strength, MPa | 10.3 min | 18.8 | 18.4 | 11.0 |
| 200% Stress, MPa | 2.1 max | 0.4 | 1.1 | 0.7 |
| Ultimate Elongation, % | 500 min | 1500 | 1200 | 1200 |
| Puncture Resistance, | 18 min | 77 | 69 | 68 |
| Tear Resistance, kN/m | 14 min | 22 | 27 | 27 |
| Surface Tack | | +++ | + | — |

The results shown in Table 5 show that all of the blends in this series met all of the ASTM-D120 requirements, except that the blend lacking polyethylene had an unacceptable level of surface tack.

Example 4

Blends of Dexco "VECTOR 4100D" Styrene-Isoprene-Styrene block copolymer and "MQF0" polyethylene "VECTOR 4100D" differs from the Enichem "KRATON" and Dexco "4113" copolymers in that "4100D" contains blocks of styrene-isoprene-styrene, whereas a significant fraction of the blocks in the "KRATON" and Dexco "4113" product are styrene-isoprene.

"VECTOR 4100D" was obtained from Dexco Inc., and "MQF0" polyethylene from Enichem, Inc. The blends shown in Table Six were produced by melt mixing as outlined in Example 2, at temperatures between 170° C. and 210° C. in lab-scale two-roll mills, and in twin-screw extruders. Injection molding was done on a 75 ton, 6 oz. molding machine.

Percent weight ratios of Dexco "4100D" styrene-isoprene block copolymer: "MQF0" ultralow density polyethylene were made at 100:0, 90:10, 90:10, and 80:20, tested according to the methods of example 1 and the results shown in Table 6.

TABLE 6

Mechanical Properties of (Styrene-Isoprene-Styrene/Ultralow-Density Polyethylene) Blends-Dexco 4100D Copolymer-MQF0 Polyethylene-

| Property | Goal, Type II Glove | 4100D/ MQF0 100/0 | 4100D/ MQF0 95/05 | 4100D/ MQF0 90/10 | 4100D/ MQF0 80/20 |
|---|---|---|---|---|---|
| Hardness, Shore A | 47 max | 38 | 41 | 41 | 46 |
| Tensile Strength, MPa | 10.3 min | 19.3 | 23.9 | 19.2 | 19.7 |
| 200% Stress, MPa | 2.1 max | 0.7 | 0.7 | 0.6 | 1.7 |
| Ultimate Elongation, % | 500 min | 1400 | 1350 | 1300 | 1500 |
| Puncture Resistance, kN/m | 18 min | 80 | 84 | 53 | 55 |
| Tear Resistance, kN/m | 14 min | 30 | 30 | 29 | 25 |
| Surface Tack | | +++ | +++ | — | — |

The results shown in Table 6 show that all of the blends in this series met all of the ASTM-D120 requirements, except that the blend lacking polyethylene had an unacceptable level of surface tack. Surprisingly, as little as 15 percent polyethylene eliminated the surface tack problems.

Example 5

Blends of Dexco "4113" styrene-isoprene block copolymer and 4041 polyethylene

"VECTOR 4113" styrene-isoprene block copolymer and 4041 ultralow density polyethylene were obtained from Exxon, Inc. Melt mixing, molding, and testing were done as above.

Percent ratios of Dexco "4113" styrene-isoprene block copolymer: 4041 polyethylene of 100:0, 80:20, 75:25, and 70:30 were made, tested according to the methods of example 1 and the results shown in Table 7.

TABLE 7

Mechanical Properties of (Styrene-Isoprene/Ultralow-Density Polyethylene) Blends-Dexco 4113 Copolymer-4041 Polyethylene-

| Property | Goal, Type II Glove | 4113/ 4041 100/0 | 4113/ 4041 80/20 | 4113/ 4041 75/25 | 4113/ 4041 70/30 |
|---|---|---|---|---|---|
| Hardness, Shore A | 47 max | 35 | 43 | 47 | 45 |
| Tensile Strength, MPa | 10.3 min | 18.8 | 18.7 | 11.2 | 16.8 |
| Tensile Set, % | 25 max | — | — | — | — |
| 200% Stress, MPa | 2.1 max | 0.4 | 0.6 | 1.0 | 0.7 |
| Ultimate Elongation, % | 500 min | 1500 | 1300 | 1100 | 1200 |
| Puncture Resistance, kN/m | 18 min | 77 | 83 | 83 | 78 |
| Tear Resistance, kN/m | 14 min | 2 | 30 | 25 | 24 |
| Surface Tack | | +++ | — | — | — |

All of the blends tested met the ASTM-D120 requirements, except that the blend lacking polyethylene had an unacceptable level of surface tack.

Example 6

Blends of Dexco "4100D" styrene-isoprene-styrene block copolymer and different polyethylenes "VECTOR 4113" styrene-isoprene block copolymer and 4041 ultralow density polyethylene were obtained from Exxon, Inc. MQF0 polyethylene was obtained from Enichem, Inc., and "B-14" and "C-39" polyethylenes were obtained from Dow Chemicals, Inc.

80:20 percent ratios of Dexco "4100D" styrene-isoprene-styrene block copolymer:polyethylene using the four different ultralow density polyethylenes were made using the above procedures, and tested according to the methods of example 1. The results in Table 8 show that all of the blends tested met the ASTM-D120 requirements.

TABLE 8

Mechanical Properties of (Styrene-Isoprene-Styrene/Ultralow-Density Polyethylene) Blends-Dexco 4100D Copolymer-

| Property | Goal, Type II Glove | 4100D 100% | 4100D/MQF0 80/20 | 4100D/ 4041 80/20 | 4100D/ B-14 80/20 | 4100D/ C-39 80/20 |
|---|---|---|---|---|---|---|
| Hardness, Shore A | 47 max | 38 | 46 | 46 | 44 | 40 |
| Tensile Strength, MPa | 10.3 min | 19.3 | 19.7 | 18.8 | 22.1 | 15.8 |
| 200% Stress, MPa | 2.1 max | 0.7 | 1.7 | 1.0 | 0.9 | 0.7 |
| Ultimate Elongation, % | 500 min | 1400 | 1500 | 1100 | 1400 | 1400 |
| Puncture Resistance, kN/m | 18 min | 80 | 55 | 124 | 101 | 67 |
| Tear Resistance, kN/m | 14 min | 30 | 25 | 37 | 31 | 24 |
| Surface | | +++ | — | — | — | — |

TABLE 8-continued

| | | Mechanical Properties of (Styrene-Isoprene-Styrene/Ultralow-Density Polyethylene) Blends-Dexco 4100D Copolymer- | | | | |
|---|---|---|---|---|---|---|
| Property | Goal, Type II Glove | 4100D 100% | 4100D/MQF0 80/20 | 4100D/ 4041 80/20 | 4100D/ B-14 80/20 | 4100D/ C-39 80/20 |
| Tack | | | | | | |

Example 7

Blends of Dexco "4100D" Type Styrene-Isoprene block copolymer and Exxon 4041 Polyethylene "VECTOR 4100D" styrene-isoprene-styrene block copolymer was obtained from Dexco, Inc., and 4041 polyethylene was obtained from Exxon, Inc. The blends shown in Table 9 were produced by melt mixing at temperatures between 170° C. and 210° C. in lab-scale two-roll mills, and in twin-screw extruders. Injection molding was done on a 75 ton, 6 oz. molding machine.

Percent weight ratios of Dexco "4100D" styrene-isoprene-styrene block copolymer: 4140 ultralow density polyethylene were made at 100:0, 90:10, 80:20, 70:30, 60:40, 50:50, 40:60, 30:70, 20:80, 10:90, and 0:100, tested according to the methods of example 1 and the results shown in Table 9.

phase shift from the styrene-isoprene matrix to the polyethylene matrix occurred. This results in Shore A hardness values being too high, and poor tensile set, characteristics resulting from the polyethylene matrix.

Example 8

Blends of Dexco "4100D" Type Styrene-Isoprene block copolymer and Dow "B-14" Polyethylene "VECTOR 4100D" styrene-isoprene-styrene block copolymer was obtained from Dexco, Inc., and "B-14" polyethylene was obtained from Dow Chemical, Inc. The blends shown in Table 10 were produced by melt mixing at temperatures between 170° C. and 210° C. in lab-scale two-roll mills, and in twin-screw extruders. Injection molding was done on a 75 ton, 6 oz. molding machine.

Percent weight ratios of Dexco "4100D" styrene-iso-

TABLE 9

| | Mechanical Properties of (Styrene-Isoprene-Styrene/Ultralow-Density Polyethylene) Blends-Dexco 4100-D Block Copolymer-4041 Polyethylene- | | | | | | | | | | |
|---|---|---|---|---|---|---|---|---|---|---|---|
| Property | Goal, Type II Glove | Styrene-Isoprene-Styrene/Ultralow-Density Polyethylene Ratios | | | | | | | | | |
| | | 100/0 | 90/10 | 80/20 | 70/30 | 60/40 | 50/50 | 40/60 | 30/70 | 20/80 | 10/90 | 0/100 |
| Hardness, Shore A | 47 max | 38 | 39 | 46 | 50 | 55 | 59 | 64 | 67 | 71 | 75 | 78 |
| Tensile Strength, MPa | 10.3 min | 23.2 | 27.6 | 24.8 | 24.8 | 18.6 | 20.4 | 21.5 | 23.3 | 26.2 | 27.0 | 28.7 |
| 200% Stress, MPa | 2.1 max | 0.6 | 0.9 | 1.2 | 1.4 | 2.1 | 2.0 | 2.3 | 2.8 | 2.8 | 3.1 | 3.4 |
| Ultimate Elongation, % | 500 min | 1400 | 1300 | 1100 | 1100 | 1000 | 900 | 900 | 900 | 700 | 800 | 800 |
| Puncture Resistance, kN/m | 18 min | 106 | 117 | 122 | 144 | 112 | 132 | 124 | 131 | 126 | 105 | 100 |
| Tear Resistance, kN/m | 14 min | 27 | 38 | 37 | 27 | 28 | 33 | 33 | 38 | 42 | 43 | 46 |
| Surface Tack | | +++ | + | — | — | — | — | — | — | — | — | — |

The results show that all blends in this series with polyethylene contents below 30 percent met all of the ASTM-D120 requirements, except that the blend lacking polyethylene had an unacceptable level of surface tack. At a polyethylene content above 40 percent, a prene-styrene block copolymer: "B-14" ultralow density polyethylene were made at 100:0, 90:10, 80:20, 70:30, 60:40, 50:50, 40:60, 30:70, 20:80, 10:90, and 0:100, tested according to the methods of Example 1 and the results shown in Table 10.

TABLE 10

| | Mechanical Properties of (Styrene-Isoprene-Styrene/Ultralow-Density Polyethylene) Blends-4100-D Block Copolymer-B-14 Polyethylene- | | | | | | | | | | |
|---|---|---|---|---|---|---|---|---|---|---|---|
| Property | Goal Type II Glove | Styrene-Isoprene-Styrene/Ultralow-Density Polyethylene Ratios | | | | | | | | | |
| | | 100/0 | 90/10 | 80/20 | 70/30 | 60/40 | 50/50 | 40/60 | 30/70 | 20/80 | 10/90 | 0/100 |
| Hardness, Shore A | 47 max | 38 | 40 | 44 | 47 | 51 | 53 | 57 | 56 | 61 | 63 | 65 |
| Tensile Strength, MPa | 10.3 min | 23.2 | 23.4 | 22.1 | 18.2 | 11.7 | 10.7 | 7.4 | 7.6 | 7.2 | 7.7 | 7.0 |
| 200% Stress, MPa | 2.1 max | 0.6 | 1.0 | 1.0 | 1.3 | 1.4 | 1.3 | 1.4 | 1.4 | 2.0 | 2.2 | 2.2 |
| Ultimate Elongation, % | 500 min | 1400 | 1200 | 1400 | 1100 | 1200 | 1200 | 1050 | 1100 | 1200 | 1000 | 1200 |
| Puncture | 18 | 106 | 102 | 101 | 76 | 79 | 73 | 73 | 74 | 63 | 73 | 67 |

TABLE 10-continued

Mechanical Properties of (Styrene-Isoprene-Styrene/Ultralow-Density Polyethylene) Blends-
4100-D Block Copolymer-B-14 Polyethylene-

| Property | Goal Type II Glove | Styrene-Isoprene-Styrene/Ultralow-Density Polyethylene Ratios | | | | | | | | | |
|---|---|---|---|---|---|---|---|---|---|---|---|
| | | 100/0 | 90/10 | 80/20 | 70/30 | 60/40 | 50/50 | 40/60 | 30/70 | 20/80 | 10/90 | 0/100 |
| Resistance, kN/m | min | | | | | | | | | | | |
| Tear Resistance, kN/m | 14 min | 27 | 29 | 31 | 26 | 31 | 27 | 26 | 28 | 31 | 31 | 32 |
| Surface Tack | | +++ | + | — | — | — | — | — | — | — | — | — |

The results show that all blends in this series with polyethylene contents below 30 percent met all of the ASTM-D120 requirements, except that the blend lacking polyethylene had an unacceptable level of surface tack. At a polyethylene content above 40 percent, a phase shift from the styrene-isoprene matrix to the polyethylene matrix occurred. This results in Shore A hardness values being too high, and poor tensile set, characteristics resulting from the polyethylene matrix.

Example 9

Blends of different styrene-isoprene-styrene block copolymer and different polyethylenes "VECTOR 4113" and "4100D" styrene-isoprene block copolymer were obtained from Dexco, and KRATON 1107 from Shell, Inc. The 4041 ultralow density polyethylene were obtained from Exxon, Inc. MQF0 polyethylene was obtained from Enichem, Inc., and "B-14" and "C-39" polyethylenes were obtained from Dow Chemicals, Inc. Melting, molding and testing were all done as outlined above. In addition, the electrical breakdown strength of the blends were measured on compression-molded samples.

80:20 percent ratios of styrene-isoprene copolymer and styrene-isoprene-styrene block copolymer:-polyethylene using the three different copolymers and the four different ultralow density polyethylenes were made using the above procedures. The results in Table 11 show that not only did all of the blends tested met the ASTM-D120 requirements, each blend exceeded the requirements. In particular, the tear strength, tensile strength, and puncture resistance all greatly exceeded the specified requirements.

TABLE 11

Properties of (Styrene-Isoprene-Styrene/Ultralow-Density Polyethylene) Blends-
80/20 Blends of Elastomer/Polyethylene-

| Property | Goal, Type II Glove | Styrene-Isoprene-Styrene/Ultralow-Density Polyethylene 80/20 Blends | | | | | | |
|---|---|---|---|---|---|---|---|---|
| | | 1107/MQF0 | 4113/MQF0 | 4100D/MQF0 | 4113/4041 | 4100D/4041 | 4100D/B-14 | 4100D/C-39 |
| Hardness, Shore A | 47 max | 45 | 45 | 46 | 47 | 46 | 44 | 40 |
| Tensile Strength, MPa | 10.3 min | 13.5 | 11.0 | 19.7 | 11.2 | 18.8 | 22.1 | 15.8 |
| 200% Stress, MPa | 2.1 max | 1.2 | 0.7 | 1.7 | 1.0 | 1.0 | 0.9 | 0.7 |
| Tensile Set, % | 25 max | 12 | — | — | — | 12.5 | — | — |
| Ultimate Elongation, % | 500 min | 1350 | 1200 | 1500 | 1100 | 1100 | 1400 | 1400 |
| Tear Resistance, kN/m | 14 min | 25 | 27 | 25 | 25 | 37 | 31 | 24 |
| Puncture Resistance, kN/m | 18 min | — | 68 | 55 | 83 | 124 | 101 | 67 |
| AC Breakdown Strength, kV/mm | 19699 min | 32523 | 32900 | 20341 | — | 33520 | 30675 | — |
| Surface Tack | | — | — | — | — | — | — | — |

Every blend tested did not exhibit current leakage prior to electrical breakdown, and it is projected that injection molded samples will show even better results.

We claim:

1. An electrical lineman's glove made of a composition comprising a mixture of a styrene:isoprene block copolymer and a ultralow density polyethylene.

2. The electrical lineman's glove of claim 1 wherein said mixture is a ratio of styrene-isoprene block copolymer:ultralow density polyethylene ranging from about 90:10 to about 60:40.

3. The electrical lineman's glove of claim 1 wherein said ratio ranges from about 90:10 to about 70:30.

4. The electrical lineman's glove of claim 1 wherein said ratio is about 80:20.

5. A method of making an electrical lineman's glove comprising molding a mixture of styrene-isoprene block copolymer and an ultralow density polyethylene into the shape of an electrical lineman's glove.

6. A method according to claim 5 wherein said molding comprises injection molding.

* * * * *